United States Patent [19]

Lenhardt et al.

[11] Patent Number: 5,079,716

[45] Date of Patent: Jan. 7, 1992

[54] METHOD AND APPARATUS FOR ESTIMATING A BATTERY TEMPERATURE

[75] Inventors: Brett M. Lenhardt; Arlen P. Walker, both of Milwaukee; William C. Delaney, Saukville, all of Wis.

[73] Assignee: Globe-Union, Inc., Milwaukee, Wis.

[21] Appl. No.: 517,622

[22] Filed: May 1, 1990

[51] Int. Cl.$^5$ .............. H02J 7/04; G01R 19/00; G06F 15/48

[52] U.S. Cl. ............... 364/483; 364/424.05; 320/30; 320/35

[58] Field of Search .......... 364/557, 424.05, 707, 364/483; 324/431; 322/33; 320/22-24, 30-32, 35; 180/65.8; 374/102, 103, 107, 169

[56] References Cited

U.S. PATENT DOCUMENTS

| | | | |
|---|---|---|---|
| 3,599,071 | 8/1971 | Lapuyade et al. | 320/31 X |
| 4,173,869 | 11/1979 | Martin, Jr. et al. | 60/646 |
| 4,301,509 | 11/1981 | Haase et al. | 364/400 |
| 4,308,492 | 12/1981 | Mori et al. | 320/32 |
| 4,377,787 | 3/1983 | Kikuoka et al. | 324/431 |
| 4,403,296 | 9/1983 | Prosky | 364/573 |
| 4,423,378 | 12/1983 | Marino et al. | 324/431 X |
| 4,537,132 | 2/1985 | Boothman et al. | 364/557 |
| 4,547,826 | 10/1985 | Premerlani | 364/557 |
| 4,598,373 | 7/1986 | Morishita et al. | 364/424.01 |
| 4,608,639 | 8/1986 | Morishita et al. | 364/424.05 |
| 4,659,977 | 4/1987 | Kissel et al. | 322/33 X |
| 4,667,143 | 5/1987 | Cooper et al. | 320/35 X |
| 4,680,530 | 7/1987 | Mashino | 322/33 |
| 4,692,216 | 9/1987 | Polansky et al. | 364/557 |
| 4,827,429 | 5/1989 | Silvestri, Jr. | 364/557 |
| 4,835,715 | 5/1989 | Bench et al. | 364/557 |
| 4,843,299 | 6/1989 | Hutchings | 320/31 |
| 4,945,299 | 7/1990 | Watanabe | 322/33 |
| 4,947,123 | 8/1990 | Minezawa | 324/431 |

Primary Examiner—Joseph L. Dixon
Attorney, Agent, or Firm—Foley & Lardner

[57] ABSTRACT

A method and apparatus for estimating the temperature of a vehicle battery, wherein the estimated temperature is used to control the voltage at which the vehicle battery is charged. The variables used to estimate the temperature of the vehicle battery can include a reference temperature sensed from one or more temperature sensors located apart from the battery, and a group of coefficients. Each type of vehicle using the vehicle battery temperature estimation method utilizes a group of coefficients tailored specifically for the vehicle. For a given type of vehicle, empirical data is compiled for determining the specific group of coefficients for the vehicle. This data is compiled by operating the vehicle, and periodically sampling and storing the vehicle speed, the reference temperature, the actual battery temperature, and the elapsed time between samplings. From this data a group of coefficient is determined for the vehicle. The coefficients are then utilized by the vehicle control unit to estimate battery temperature. Based upon the estimated battery temperature, the control unit then can control the voltage at which the vehicle battery is charged.

11 Claims, 13 Drawing Sheets

```
/* Calculates table Thermal coefficient                                    */
/*                                                                         */
/*   This Routine will calculate the temperature coefficient for a battery */
/*   from data within a given table.  The convergence isn't pretty but it  */
/*   works.  It assumes the coefficient will be between zero and one, and it */
/*   searches this territory in a binary fashion until it arrives at the   */
/*   closest number.                                                       */
/*                                                                         */
/*      First completed           16 - Feb - 1989         A. P. Walker     */
/*                                                                         */
/*      Names for drive states and separate error handling provisions for  */
/*      batch and interactive processing were added.                       */
/*      Revision date             12 - Sep - 1989         A. P. Walker     */
/*                                                                         */
/*      Internal documentation of this routine was improved.               */
/*      Revision date             04 - Jan - 1990         A. P. Walker     */
/*                                                                         */
/*      This routine copyright 1989 by A. P. Walker and Johnson Controls.  */
/*      All rights reserved.                                               */
/*                                                                         */
procedure (tabname, UHTcol, BTcol, STATEcol, ETMcol);

names[1] = "Off";         /* Table of state names */
names[2] = "Idle";
names[3] = "City";
names[4] = "Hiway";
names[5] = "Whatever";

IF GLOBAL vse_error_proc THEN
BEGIN;
    TYPE "CalCoeff -- Error in previous procedure.";
    RETURN;
END;

IF EMPTY(tabname) THEN
    tabname = GLOBAL vse_tablename;
/*
 *   If any of the parameters cannot be determined at run time, check to
 *   see if we're being run interactively.  If we are, then prompt for the
 *   parameter.  If not, then tell the system we've had an error and go
 *   home with our tail between our legs.
 */
IF EMPTY(tabname) THEN
BEGIN;
    TYPE "CalCoeff -- No Input tablename given.";
    IF (NOT #interactive()) THEN
    BEGIN;
        GLOBAL vse_error_proc = TRUE;
        RETURN;
    END;
    ELSE;
    BEGIN;
        tabname = GETTABLE("Enter the name of the table to analyse :",,,,
    "This Procedure will calculate Thermal Coefficients for a data table.
Please enter the name of the RS/E table to calculate these coefficients
for.");
    END;
END;
```

*FIG. 10A*

```
IF EMPTY(UHTcol) THEN
   UHTcol = GLOBAL vse_drive_temp_col;

IF EMPTY(UHTcol) THEN
BEGIN;
   TYPE "CalCoeff -- No Driving Temp Column given.";
   IF (NOT #interactive()) THEN
   BEGIN;
      GLOBAL vse_error_proc = TRUE;
      RETURN;
   END;
   ELSE;
   BEGIN;
      UHTcol = GETCOL("Enter the column for the driving
temperature :",tabname,false,false,,"This Procedure will calculate Thermal
Coefficients for a data table.  Please enter the column name or number
which contains the temperatures to be used as the driving thermal force for
the calculations.");
   END;
END;

IF EMPTY(BTcol) THEN
   BTcol = GLOBAL vse_batt_temp_col;

IF EMPTY(BTcol) THEN
BEGIN;
   TYPE "CalCoeff - No Battery Temperature Column given.";
   IF (NOT #interactive()) THEN
   BEGIN;
      GLOBAL vse_error_proc = TRUE;
      RETURN;
   END;
   ELSE;
   BEGIN;
      BTcol = GETCOL("Enter the battery temperature
column :",tabname,false,false,,"This Procedure will calculate Thermal
Coefficients for a data table.  Please enter the number or name of the
column in table ".tabname." which contains the thermally driven
temperatures.  This temperature is usually the temperature of one of the
inner cells of the battery.");
   END;
END;

IF EMPTY(STATEcol) THEN
   STATEcol = GLOBAL vse_state_col;

IF EMPTY(STATEcol) THEN
BEGIN;
   TYPE "CalCoeff -- No Engine State Column given.";
   IF (NOT #interactive()) THEN
   BEGIN;
      GLOBAL vse_error_proc = TRUE;
      RETURN;
   END;
   ELSE;
   BEGIN;
      STATEcol = GETCOL("Enter the column for the engine
states :",tabname,false,false,,"This Procedure will calculate Thermal
Coefficients for a data table.  Please enter the number or name of the
column in table ".tabname." which contains the indicator variable Engine
State.  The variable ranges from
```

*FIG. 10B*

```
1 to 4 indicating engine off, idling, city driving, and hiway driving.");
    END;
END;

IF EMPTY(ETMcol) THEN
    ETMcol = GLOBAL vse_etm_col;

IF EMPTY(ETMcol) THEN
BEGIN;
    TYPE "CalCoeff -- No Elapsed Time in Minutes column given.";
    IF (NOT #interactive()) THEN
    BEGIN;
        GLOBAL vse_error_proc = TRUE;
        RETURN;
    END;
    ELSE;
    BEGIN;
        ETMcol = GETCOL("Enter the elapsed time in minutes
column:",tabname,false,false,"This Procedure will calculate Thermal
Coefficients for a data table.  Please enter the number or name of the
column containing the elapsed time in minutes for the test.  The coefficients
are calculated in terms of degrees per minute, so the time values MUST BE
IN MINUTES.");
    END;
END;

DO i = 1 to LASTROW(tabname);
    IF (tabname[i,STATEcol] > 1) THEN DOEXIT;
END;

IF (i >= LASTROW(tabname)) THEN
BEGIN;
    TYPE "No STATE changes found in table.";
    RETURN;
END;

start = i;
outrow = 1;
passes = 0;

/*  This procedure uses an iterative process to calculate the coefficients.  */
/*  It assumes the coefficient will be somewhere between zero and one,       */
/*  and it predicts the temperature using evenly spaced coefficients         */
/*  through that range.  It checks the variance of each coefficient (the     */
/*  square of the errors) and narrows its range until it finds the lowest    */
/*  variance.  It does not consider coefficient with a difference below      */
/*  .000001 to have a significant difference.                                */

DO WHILE start < LASTROW(tabname);
    c[1] = 1;
    c[2] = .75;
    c[3] = .5;
    c[4] = .25;
    c[5] = 0;

passes = passes + 1;

this_state = tabname[start,STATEcol];
DO i = start to (LASTROW(tabname)-1);
   IF (tabname[i,STATEcol] <> this_state) THEN DOEXIT;
END;
finish = i;
DO WHILE (c[1] - c[5]) > .000001;
   DO j = 1 to 5;
      IF (e[j] < 0) THEN
      BEGIN
         workspace[1,1] = tabname[start,BTcol];
         workspace[1,2] = 0;
         DO i = (start + 1) to finish;
            DT1 = tabname[i-1,UHTcol];
            DT2 = tabname[i,UHTcol];
            BT1 = workspace[i-start,1];
            dt = tabname[i,ETMcol] - tabname[i-1,ETMcol];
            CALL #tpredict(DT1, DT2, BT1, dt, c[j], BT2);
            workspace[i-start+1,1] = BT2;
            workspace[i-start+1,2] = tabname[i,BTcol] -
                                    workspace[i-start+1,1];
            workspace[i-start+1,3] = workspace[i-start+1,2] ** 2;
         END;

e[j] = SUM OF ROWS 1 TO (finish-start+1) OF COL 3 OF
                        TABLE(workspace);
      END;
   END;

Ilow = 1;
   DO i = 2 to 5;
      IF (e[i] < e[i-1]) THEN Ilow = i;
   END;
   IF (Ilow = 1) THEN Ilow = 2;
   IF (Ilow = 5) THEN Ilow = 4;

nc[3] = c[Ilow];
   newe[3] = e[Ilow];

nc[1] = c[Ilow-1];
   newe[1] = e[Ilow-1];

nc[5] = c[Ilow+1];
   newe[5] = e[Ilow+1];

nc[2] = (nc[1] + nc[3]) / 2;
   newe[2] = -1;

nc[4] = (nc[3] + nc[5]) / 2;
   newe[4] = -1;

DO i - 1 TO 5;
      c[i] = nc[i];
      e[i] = newe[i];
```

*FIG. 10D*

```
      END;
  END;

IF notempty(tabname[start,STATEcol]) then
      begin;
          output[outrow,1] = names[tabname[start, STATEcol]];
          output[outrow,2] = c[3];
      end;

start = finish;
  outrow = outrow +1;

END;

/*   The 'ES' table will contain data which applies to each of the phases   */
/*   of the test. This procedure will create it. It will yield an error     */
/*   message if the table already exists, so it displays the table first,   */
/*   allowing you to recover by manually entering the data into the table   */
/*   if it fails.                                                           */ display table(output);
estab = tabname."ES";
make table(estab) from table(output);
estab[0,1] = "State";
estab[0,2] = "Coefficient";

TYPE "CalCoeff -- Thermal Coefficients Calculated.";
GLOBAL vse_error_proc = FALSE;

END;
```

*FIG. 10E*

```
/* Predicts Single battery temperature                                    */
procedure (DT1, DT2, BT1, dt, coefficient, BT2);

/*    This procedure will calculate a predicted battery temperature (BT2) */
/*    from two given driving temperatures (DT1 & DT2) the time interval   */
/*    between points (dt) and the coefficient of thermal transfer         */
/*    (coefficient).                                                      */
/*                                                                        */
/*              A. P. Walker           Feb-15-89 numerator = BT1 + ((DT2+DT1-BT1) * (coefficient*dt/2));
    denominator = 1 + (coefficient*dt/2);
    BT2 = numerator / denominator;
END;
```

*FIG. 10F*

METHOD AND APPARATUS FOR ESTIMATING A BATTERY TEMPERATURE

BACKGROUND OF THE INVENTION

This invention relates to a method charging of a battery based upon an estimated battery temperature, and, more particularly, to an apparatus estimation of a vehicle's battery temperature under varying conditions. The estimated vehicle temperature is based upon the temperature sensed at one or more temperature sensors disassociated from the battery and a value representative of vehicle speed.

In most vehicles, the vehicle battery is charged using the rectified output voltage from an alternator, wherein the level of voltage at which the battery is charged is controlled by a voltage regulator. Furthermore, it is known that a battery's charging characteristics are dependent upon the temperature of the battery, and, in particular, that there are optimal ranges of charging voltages associated with different battery temperatures. Some of the problems encountered when a battery is charged at voltages poorly suited for the battery temperatures are shortened battery life, and, in some cases, battery damage.

Accordingly, to properly charge a vehicle battery, the voltage at which the battery is charged should be based upon the temperature of the battery. Additionally, when battery temperature is used as a guide for determining the charge voltage of a battery, a method or apparatus must be provided to supply a relatively accurate representation of the battery temperature.

U.S. Pat. Nos. 4,598,373 (Morishita et al., issued on July 1, 1986) and 4,608,639 (Morishita et al., issued on August 26, 1986) recognize the difficulties in effectively correcting for a battery's changing charging characteristics due to temperature changes of the battery.

U.S. Pat. No. 4,598,373 relates to a charge control apparatus for a vehicle having a microcomputer which calculates a battery charging value or voltage regulator set value on the basis of detected engine and charging system parameters. The apparatus includes a microcomputer for providing a reference voltage signal based upon: the charge condition and service life condition of the battery; voltage data; battery terminal data; battery sensor data; charge-discharge current data; and engine data. The reference voltage signal is applied to the external control terminal of the voltage regulator. The voltage at the control terminal is thereby set to a value which is calculated from the various data for suitably charging the battery. In the preferred embodiment of the apparatus, the battery sensor data includes the solution temperature, specific gravity, or acidity of the battery.

U.S. Pat. Nos. 4,608,639 relates to a charge control apparatus having a microcomputer for: processing charging system data such as battery output voltage, generator output voltage, and generator output current; and generating at least one engine parameter from an engine control microcomputer to provide a suitable voltage to charge the battery. In the preferred embodiment of the apparatus, the engine parameters include intake air temperature, engine r.p.m., crank angle, exhaust gas temperature, or air-fuel ratio.

In addition to the problem of determining an optimum voltage at which a battery should be charged for a given temperature, economic and quality control constraints have forced vehicle manufacturers to reduce the number of sensors used in a vehicle where possible. Thus, in some situations, a temperature sensor at the battery for providing actual battery temperature data will not be available. Accordingly, it would be advantageous if the temperature of a vehicle battery could be determined or estimated without requiring a separate temperature sensor at the battery. Rather, it would be advantageous to use the data from a preexisting sensors in a vehicle to estimate battery temperature.

One problem encountered when attempting to estimate battery temperatures based upon temperatures sensed at a temperature sensor disassociated with the battery, is that many modern automobiles have underhood temperatures which are extremely dynamic within a very large temperature range. Factors which attribute to this characteristic of modern automobiles are hotter running engines, low profile and aerodynamic front end styles, electric radiator fans, and more compact underhood designs. For example, the temperature at a voltage regulator is a poor estimate of battery temperature since the voltage regulator has a lower thermal mass than the battery and will have a temperature which follows underhood temperatures much closer than that of the battery.

SUMMARY OF THE INVENTION

The present invention provides a method and apparatus for charging a vehicle battery located in the engine compartment of a vehicle. Charging the vehicle battery in one embodiment of the invention comprises the steps of: reading first and second reference temperatures from a temperature sensor within the engine compartment at first and second times, respectively; determining a value representative of vehicle speed at the second time; and determining a time difference between the first time and the second time. Based upon the value representative of the vehicle speed, another step is performed where a lookup function is utilized to determine a coefficient. An estimated vehicle battery temperature is then determined using a function having the first reference temperature, the second reference temperature, the time difference, and the coefficient as variables. Using the estimated vehicle battery temperature, an acceptable range of battery charging voltages for the estimated temperature is determined, and the battery charging voltage read at the second time is compared to the range of battery charging voltages. When the battery charging voltage is outside of the battery charging voltage range, the battery charging voltage is adjusted to fall within the range.

An advantage of the present invention is that a processor within the vehicle can be used to determine the temperature of a vehicle battery based upon the data retrieved from one or more preexisting sensors in the vehicle. Another advantage of the present invention is that the processor of the vehicle can function to process the estimated temperature to provide the battery with a proper charging voltage.

Another advantage of the present invention is that the battery degree-hours (summation of temperature x time values) can be used to estimate remaining battery life.

Another advantage of the present invention is that the estimated temperature can be used to turn on a vehicle battery cooling fan.

BRIEF DESCRIPTION OF THE DRAWINGS

FIGS. 10A-10F list the program for calculating $C_T$.

DETAILED DESCRIPTION OF THE PREFERRED EXEMPLARY EMBODIMENT OF THE INVENTION

Figure 1:
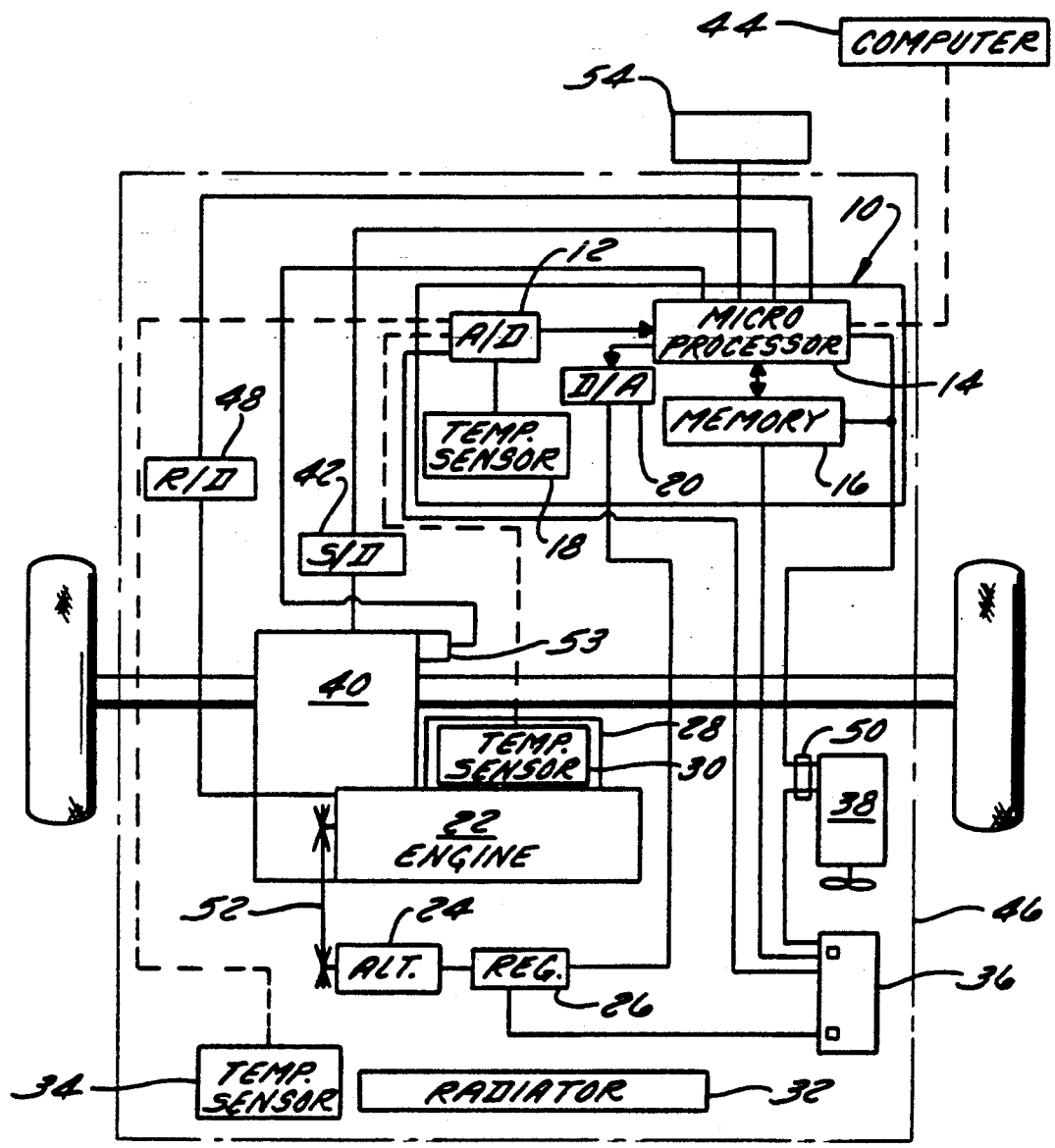
FIG. 1 illustrates a schematic representation of selected vehicle underhood components.

FIG. 1 schematically illustrates the main components of the hardware utilized with the preferred embodiment of the battery temperature estimation scheme. These components include: a control unit 10, having an analog-to-digital convector (AD Convector) 12, a microprocessor 14, a memory unit 16, a temperature sensor 18, and a digital-to-analog convector (D/A Convector) 20; an engine 22; an alternator 24; a voltage regulator 26; an intake manifold 28; an intake manifold temperature sensor 30; a radiator 32; a radiator temperature sensor 34; a battery 36; a battery cooling fan 38; a transmission 40; a vehicle speed to digital signal transducer (S/D Unit) 42, an engine RPM to digital signal transducer (R/D Unit) 48; and an external computer 44. With the exception of the computer 44, these components are illustrated as being located within the schematically illustrated vehicle engine compartment 46 located under the hood of a vehicle.

The estimation scheme is intended to be employed with existing vehicle control units 10, wherein the size and configuration of the memory unit 16 may be modified to enable the memory unit 16 to store the programming necessary to allow the microprocessor 14 to implement the temperature estimation scheme. It should be understood that the portion of the memory unit 16 for storing the programming may, for example and not by way of limitation, take the form of read only memory (ROM), erasable programmable memory (EPROM), or electrically erasable programmable memory (EEPROM). Power for the control unit 10 is provided by the battery 36.

The A/D Convector 12 is configured to convert a plurality of analog signals to digital signals. In particular, one or more of the analog inputs of the A/D Convector 12 can be coupled to one or more of the temperature sensors 18, 30, 34. The A/D Convector converts the analog representations (voltage) of the temperatures sensed at the temperature sensors 18, 30, 34 to digital signals representative of the temperatures sensed. Another one of the analog inputs of the A/D Convector 12 is coupled to the battery terminals, and provides a digital signal representative of the battery voltage during the different stages of battery operation, including battery charging. The digital outputs are coupled to the microprocessor 14 to provide the microprocessor 14 with digital signals representative of one or more temperatures sensed and the voltage of the battery 36. It should be understood that the control unit 10 may provide additional A/D Convector conversions for parameters such as engine oil pressure, exhaust manifold temperature, or fuel level etc.

The first temperature sensor 18 is located within the control unit 10, and provides an analog representation of the temperature at the control unit 10. The second temperature sensor 30 can be located upon, or within, the intake manifold 28 to provide an analog representation of the temperature of the intake manifold 28 or engine intake air. (Due to the thermal mass of the manifold, the intake manifold and intake air temperatures may not be the same.) The third temperature sensor 34 can be located upon, or within, the radiator 32 to provide an analog representation of the temperature of the radiator 32 or radiator fluid.

The preferred embodiment of the temperature estimating scheme can be used with many different vehicle types, thus, a particular vehicle may not include all of the temperature sensors 18, 30, 34 shown. In some vehicles, additional temperature sensors, such as a temperature sensor located at a turbocharger, may be available. The current embodiment of the temperature estimating method utilizes a temperature value derived from the digital signal from the A/D Convector 12 corresponding to the temperature sensed at the intake manifold temperature sensor 30, but the temperature estimating scheme could be adapted to use another temperature sensor 30, 34 or a temperature sensor not shown. Furthermore, for some vehicles, it may be advantageous to implement the temperature estimating scheme by utilizing a digital temperature value which is a function of the temperature values from a plurality of temperature sensors.

For example, the digital signals from the A/D Convector 12 corresponding to all of the temperature sensors 18, 30, 34 and additional temperature sensors (not shown) could be averaged to produce a temperature value. The average could also take the form of a weighted average, wherein weighting factors could be assigned to the digital signals representative of the temperatures from the temperature sensors. The weighting factors could be assigned based upon factors such as the location of the sensors within the vehicle.

A vehicle speed to digital signal transducer (S/D Unit) 42 is coupled to the microprocessor 14 for providing the microprocessor 14 with digital signals representative of vehicle speed. The S/D Unit 42 is provided a signal with a frequency proportional to vehicle speed from an inductive pickup (not shown) and converts the signal to a digital signal representative of vehicle speed. The inductive pickup is associated with a wheel or other means for alternating the air gap distance at the core of the inductive pickup coil to produce the pulses of the signal at a frequency proportional to vehicle speed. The inductive pickup and wheel may be located within the transmission 40, or separate from, and mechanically coupled to, the transmission 40.

Many vehicles include a cruise control system which is part of the control unit 10. For these vehicles, the microprocessor 14 may already be provided with a digital signal representative of vehicle speed thus the S/D Unit 42 may not be required. Other vehicles include cruise control units, separate from the control unit 10, which produce a digital signal representative of vehicle speed. For these vehicles, the S/D Unit 42 is also not required, but a data link must be provide from the cruise control unit to the microprocessor 14.

The engine RPM to digital signal transducer (R/D Unit) 48 is coupled to the microprocessor 14 for providing the microprocessor 14 with digital signals representative of engine RPM. The R/D Unit 48 is provided a signal with a frequency proportional to engine RPM, and converts the signal to a digital signal representative of engine RPM. The signal may be from the vehicle ignition system, or from the vehicle fuel injection system.

In some vehicles, the ignition and/or the vehicle fuel injection system may be controlled by the control unit 10. For these vehicles, the microprocessor 14 will be provided with a digital signal representative of engine RPM, and the R/D Unit 48 will not be necessary.

A digital to analog converter D/A 20 is coupled to the microprocessor 14 for providing the voltage regulator 26 with a control signal for controlling the voltage at which the battery 36 is charged. The current supplied by the voltage regulator 26 to the battery 36 is provided to the voltage regulator 26 by the alternator 24. The alternator 24 is driven by the engine 22 with a belt drive 52, and includes a rectification circuit for rectifying the alternator current being supplied to the voltage regulator 26.

A switch unit 53 may be provided between the transmission 40 and the microprocessor 14 for supplying the microprocessor 14 with a digital signal representative of the gear in which the vehicle is operating.

A fan control circuit 50 can be coupled to the microprocessor 14, battery 36 and cooling fan 38 for cooling the battery 36. The microprocessor 14 supplies the fan control circuit 50 with a digital ON or OFF signal which is supplied to an appropriate amplifying and buffering circuit for controlling a relay or a power transistor which switches the fan 38 ON and OFF.

BATTERY ESTIMATION METHOD OPERATION

Referring now to the battery temperature estimation method, this method involves solving a relationship, based upon the following differential equation, using the vehicle microprocessor 14 for purposes of estimating the vehicle battery temperature ($T_{batt}$):

$$T_{batt} = T_{uh} - (dT_{batt}/dt)C_T, \qquad (1)$$

wherein $T_{uh}$ is a reference temperature value derived from the intake manifold temperature sensor 30, and $C_T$ is one of a group of constants having a value between 0 and 1 stored in the memory 12. $C_T$ is selected to solve the equation based upon the vehicle data supplied to the microprocessor 10. $C_T$ can be stored in a lookup table referenced to one of a plurality of vehicle states (vehicle speed ranges and engine states), or calculated from a function wherein $C_T$ is calculated based upon a function of vehicle speed or engine speed.

Presently, $C_T$ is provided in reference to a lookup table, wherein $C_T$ is referenced to one of four vehicle states. In the first state the engine is not running (STATE I), in the second state the engine is running and the vehicle is operating between 0 and 5 mph (STATE II), in the third state the vehicle is operating between 5 and 35 mph (STATE III), and in the fourth state the vehicle is operating above 35 mph (STATE IV). While more than four vehicle states could be used, the use of four vehicle states minimizes the amount of computation required by the microprocessor 14 and provides a relatively reliable range of $C_T$ for purposes of estimating battery temperature. As the computational speed and power of microprocessors 14 used in vehicles increases, the number of states which can be effectively used to determine $C_T$ may also increase.

The determination of $C_T$ for each of the states will be discussed in detail below under the heading DETERMINATION OF $C_T$.

Figure 2A:
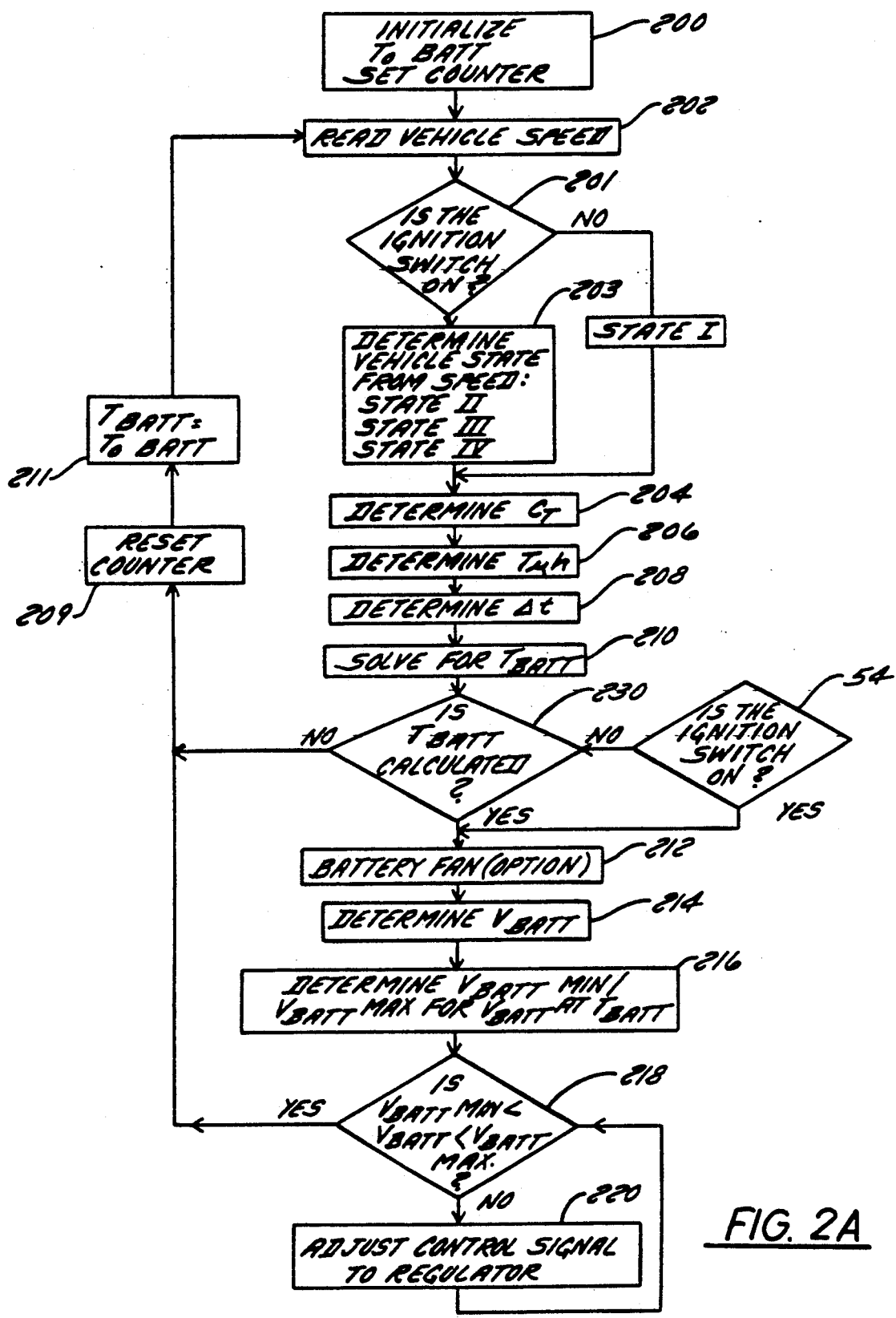
FIG. 2A is the flowchart illustrating the steps implemented to estimate vehicle battery temperature.

FIG. 2A is the flowchart generally illustrating the steps performed by the microprocessor 14 for estimating vehicle battery temperature. In step 200, the initial value of the battery temperature $T_{batt-1}$ is set, the initial value of the underhood temperature $T_{uh-1}$ is set, and a time counter is set. $T_{batt-1}$ and $T_{uh-1}$ may be constants stored in memory 16 or assumed to be $T_{uh}$.

In step 201, the microprocessor 14 reads the input from ignition switch 54 to determine whether the engine is OFF or ON. If the engine is OFF, the state is set to STATE 1. If the engine is ON, then a vehicle speed is calculated in step 202.

In step 202, the digital signal representative of vehicle speed is supplied to the microprocessor 14 from the S/D Unit 42. From this signal, the microprocessor 14 calculates a vehicle speed value. In another embodiment of the method, digital signal representative of the vehicle speed may be determined by the microprocessor 14 based upon the signal representative of engine RPM and a signal representative of the gear ratio associated with the gear in which the transmission is operating. Thus, the vehicle speed value would be determined with the following equation:

$$Vehicle\ speed = RPM \times gear\ ratio \times C \qquad (2)$$

wherein C is a constant based upon vehicle tire size and other factors not taken into account by the signal representative of the gear ratio. By way of example, the digital signal representative of vehicle speed may also be based upon other engine or vehicle parameters in addition to engine RPM.

In step 203, the state is set to one of STATES II-IV depending upon the vehicle speed value.

In step 204, $C_T$ is selected from one of four $C_T$S based upon the vehicle state. $C_T$ is determined by the microprocessor 14 using the state to enter the lookup table stored in memory 16.

In step 206, the digital signal provided by the A/D Convector 12 representative of the temperature sensed at the temperature sensor 30 is read by the microprocessor 14. This signal is processed to provide an under hood temperature value $T_{uh}$.

In step 208, a change in time $\Delta t$ is calculated by subtracting the original time $t_0$ from the current time t. This can be accomplished by using a the microprocessor 14 clock as a time base for the time counter and then multiply the counter count by the microprocessor 14 clock cycle time. In step 209, the counter is reset In step 210, the equation implemented by the microprocessor 14 for solving the relationship based upon the differential equation illustrated above as equation (1) is shown. $T_{batt}$ is estimated by adding $T_{batt-1}$ to the product of $C_{Tx}\Delta t/2$ and $(T_{uh}+T_{uh-1}2-T_{batt-1})$, and then dividing this sum by $(1+C_{Tx}\Delta t/2)$. In step 211 $T_{batt-1}$ is set to the estimated $T_{batt}$ for the next loop, and $T_{uh-1}$ is set to $T_{uh}$.

Figure 2B:
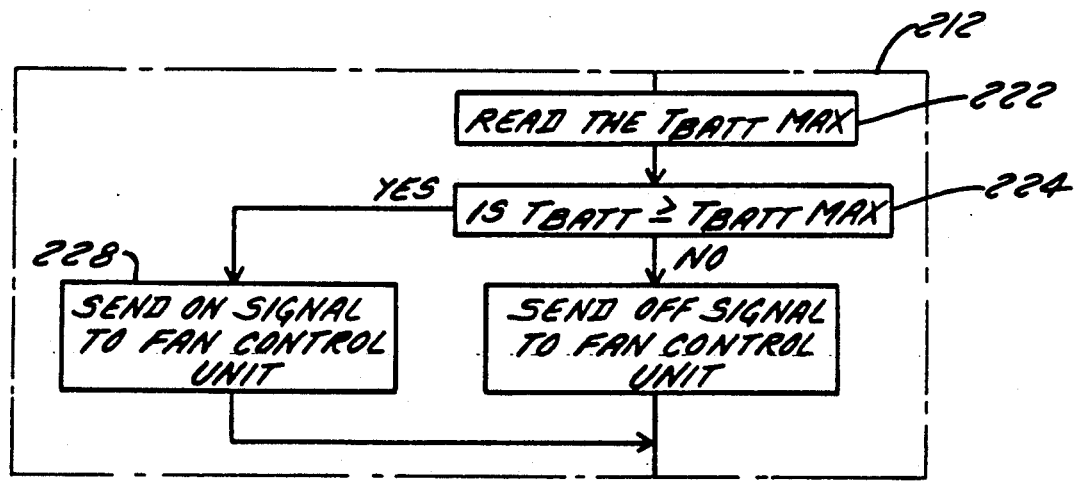
FIG. 2B is a flowchart illustrating the additional steps implemented when a vehicle utilizes an optional battery cooling fan.

Step 212 is present when the vehicle using the battery temperature estimation method includes a battery fan 38 and the fan control unit 50. Step 212 includes the steps illustrated in FIG. 2B. In step 222, a maximum allowable battery temperature $T_{batt-max}$ is read from the memory 16. In step 224 the estimated battery temperature $T_{batt}$ is compared against $T_{-max}$. If $T_{batt}$ is greater than or equal to $T_{batt-max}$ then, in step 228, an ON signal is sent to the fan control unit 50. If $T_{batt}$ is less than $T_{batt-max}$ then, in step 226, an OFF signal is sent to the fan control unit 50.

In step 214, the digital signal provided by the A/D Convector 12 representative of the battery voltage is read by the microprocessor 14. This signal is processed to provide a battery voltage value $V_{batt}$.

Figure 3:
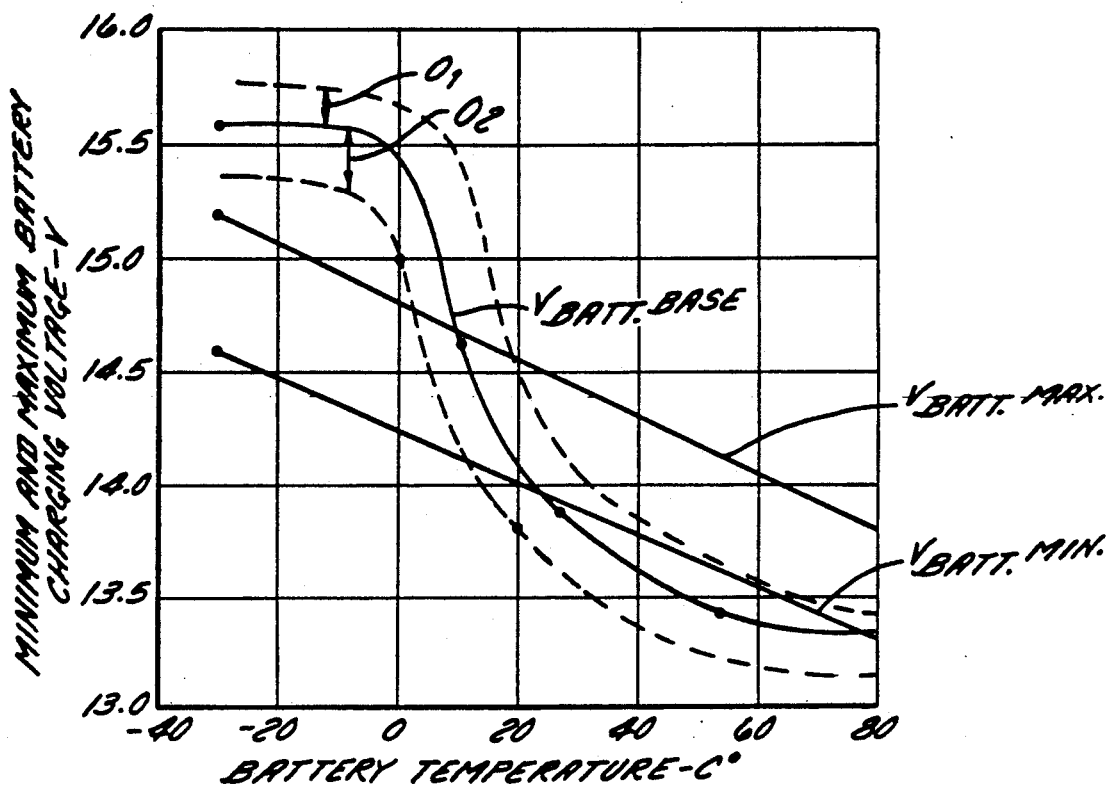
FIG. 3 is a graph illustrating maximum and minimum voltages at which vehicle batteries can be charged for a range of battery temperatures.

In step 216, the minimum battery charging voltage $(V_{batt-min})$ and the maximum battery charging voltage $(V_{batt-max})$ are determined based upon $T_{batt}$. This can be accomplished by looking up $V_{batt-min}$ and $V_{batt-max}$ in a lookup table stored in the memory 16, or by providing $V_{batt-min}$ and $V_{batt-max}$ as a function of $T_{batt}$. FIG. 3 is a graphical representation of the minimum and maximum battery charging voltages versus battery temperatures. The range for these voltages can provided in the form of a region falling between two lines $V_{batt-max}$ and $V_{batt-min}$. For example, referring to FIG. 3, at a battery temperature of 0° C., $V_{batt-min}$ would be about 14.25 v and $V_{batt-max}$ would be about 14.80 v. The range for the charging voltages can also be provided by adding a first offset $O_1$ to a base function $V_{batt-base}$ or subtracting a second offset $O_2$ from the base function $V_{batt-base}$, wherein the first offset is not necessarily equal to the second offset. The base function provides a reference battery charging voltage which is a function of battery temperature. For example, referring to FIG. 3, at a battery temperature of 0° C., $V_{batt-min}$ would be about 15 v and $V_{batt-max}$ would be about 15.75 v. Of course, the method for determining the range for charging voltages will depend upon the specific application.

For batteries having a well established charging voltage, $V_{batt-min}$ may be equal to $V_{batt-max}$. Accordingly, the lookup table would only require one value used for both $V_{batt-min}$ and $V_{batt-max}$, and offset O, would be 0.

In step 218, $V_{batt}$ is compared to $V_{batt-min}$ and $V_{batt-max}$. When $V_{batt}$ is between $V_{batt-min}$ and $V_{batt-max}$, steps 209 and 211 are executed and control is returned to step 202. When $V_{batt}$ is outside of $V_{batt-min}$ and $V_{batt-max}$, step 220 is executed.

In step 220 the control signal to the regulator is adjusted up or down depending on whether $V_{batt}$ is greater than $V_{batt-max}$ or less than $V_{batt-min}$. Step 220 is looped through until $V_{batt}$ is between $V_{batt-min}$ and $V_{batt-max}$.

Depending upon the vehicle and vehicle manufacturer considerations, the control unit 10 can be configured such that $T_{batt}$ is continuously being updated, even when the vehicle engine is not running. With this configuration it is useful to provide an additional step 230 as shown in FIG. 2A. In step 230 the microprocessor 14 reads the input from ignition switch 54 to determine whether the switch is ON or OFF. For applications wherein the battery temperature is not continuously calculated and the ignition switch is OFF, the steps following step 230 are skipped since they do not provide a useful function when the vehicle is turned OFF. For applications wherein the battery temperature is continuously calculated and the ignition switch is OFF, the steps following step 230 are executed even if the vehicle is turned OFF.

Figure 2C:
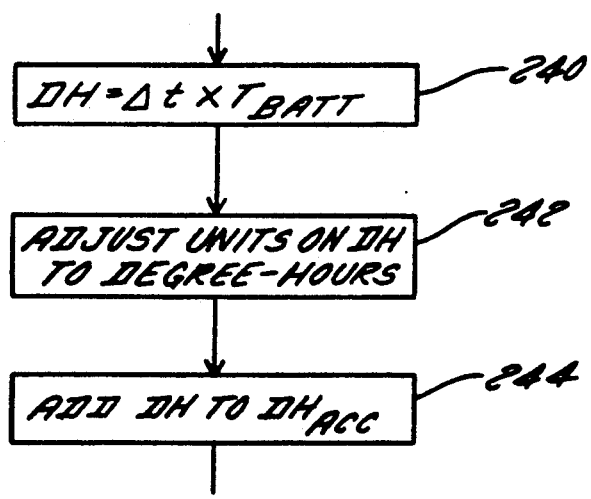
FIG. 2C is a flowchart illustrating the additional steps implemented when a vehicle utilizes a battery degree-hour accumulation feature.

A feature which can be included in the temperature estimation scheme is the calculation and accumulation of a battery degree-hour (summation of degree×hour values) value. The battery degree-hour value can then be used to estimate remaining battery life. FIG. 2C illustrates the flowchart for a method for calculating and accumulating battery degree-hours. If implemented, the steps for this process would be executed subsequent to the steps for solving the equation at step 210 illustrated in FIG. 2A.

Referring to FIG. 2C, the elapsed time $\Delta t$ is multiplied by the estimated battery temperature to provide a degree-hour (DH) value (step 240), the units of DH are adjusted to provide DH in units of degree-hours (step 242), and DH is added to an accumulated total of DHs $(DH_{acc})$(step 244).

The value of $DH_{acc}$ can be stored in a memory associated with the control unit 10 which is nonvolatile. For example, a battery backed up RAM could be used to store a current $DH_{acc}$ value. Accordingly, the microprocessor 14 can be programmed to produce an information signal provided to the vehicle operator when $DH_{acc}$ reaches or exceeds a predetermined limit

DETERMINATION OF $C_T$

In general, $C_T$ is calculated for a number of vehicle speeds based upon the type of vehicle using the temperature estimating method, the type of battery used in the vehicle, the actual temperature of the vehicle battery $(T_{act})$, and the reference underhood temperature $(T_{uh})$. Subsequent to calculating $C_T$ for a group of vehicle speeds for a given vehicle and battery type, the $C_T$ values are loaded into the memory 16 from a computer 44 coupled to the control unit 10. The $C_T$ values are configured in the memory 16 as a lookup table wherein $C_T$ values are referenced to a particular vehicle speed. For some vehicle and battery types it may be practical to calculate $C_T$ as a function of vehicle speed. In most situations though, less microprocessor 14 computing time is needed to determine $C_T$ from a lookup table than from a function using vehicle speed as the variable.

Figure 4:
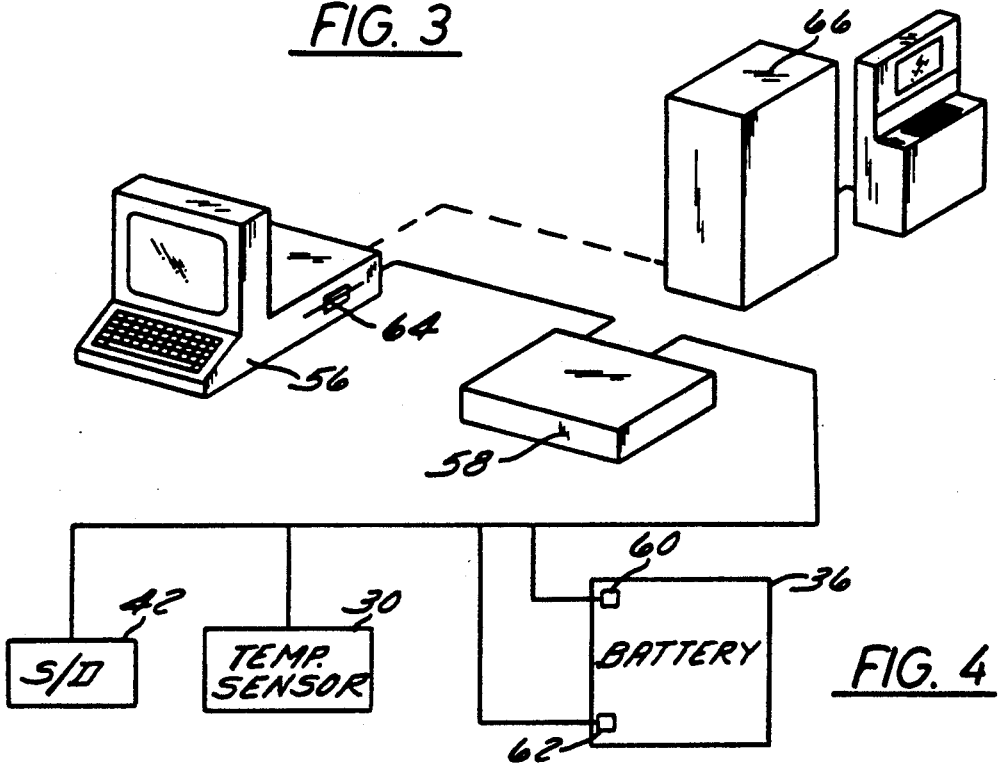
FIG. 4 illustrates a schematic representation of the hardware used to compile vehicle data and calculate coefficients ($C_T$s) based upon the vehicle data.

To determine $C_T$ for a vehicle, the first step is to actually operate a particular vehicle type and compile the data necessary for calculating $C_T$ for the vehicle. The compilation of data requires reading and recording $T_{act}$ and $T_{uh}$ in reference to vehicle speed. As part of this first step, the battery type, the battery location, and the $T_{uh}$ temperature sensor location must be recorded Compiling the data necessary for calculating $C_T$ can be simplified by using the arrangement illustrated in FIG. 4. This arrangement includes a portable computer 56 (Toshiba T1100 Plus including a floppy disc drive 64), a Fluke data logger 58, and one or more battery temperature sensors 60, 62. The output of the data logger 58 is coupled to the RS-232 serial port of the computer 56. The temperature sensors 30, 60 and 62 are coupled to the analog inputs of the data logger 58, and the digital output of the S/D Unit 42 is coupled to the digital input of the data logger 58.

The data logger 58 periodically converts the input signals to ASCII values at a predetermined time interval, for example every ten (10) second. The data logger 58 converts the analog inputs (voltages) from the temperature sensors 30, 60, and 62 to an ASCII values representative of the temperatures sensed. The data logger 58 also converts the digital signal from the S/D Unit 42 to an ASCII value representative of the vehicles speed. The data logger 58 can be programmed to scale the ASCII temperature values to actual temperatures in degrees Celsius or Fahrenheit, and scale the ASCII vehicle speed values to actual vehicle speed in miles-per-hour.

Each group of ASCII values (temperatures and associated vehicle speed) is transmitted from the data logger 58 to the serial port of the computer 56, wherein each group of values is stored at the disc drive 64. The disc drive used for storage could also be a hard disc drive (not shown).

The disclosed use of more than one temperature sensor 60, 62 on the battery may or may not be require depending upon the battery type and vehicle. An advantage of using more than one battery temperature sensor, is to provide a more accurate measurement of battery temperature, and, accordingly, improved $C_T$ values. A relatively accurate measurement of battery temperature can be achieved by submersing the temperature sensors 60, 62 in the electrolyte of two battery cells. For example, one sensor 60 may be placed in the battery cell at one end of the battery, the other sensor 62 may be placed in the battery cell at the opposite end of the battery, and the average of the two sensed temperature used as the battery temperature.

The data used for calculating $C_T$ is compiled during a plurality of predefined operating states of the vehicle. As discussed above, in these states, the data is compiled while the engine is not running (STATE I), while the engine is running and the vehicle is operating from 0 to 5 mph (STATE II), while the vehicle is operating between 5 and 35 mph (STATE III), and while the vehicle is operating above 35 mph.

Figure 5:
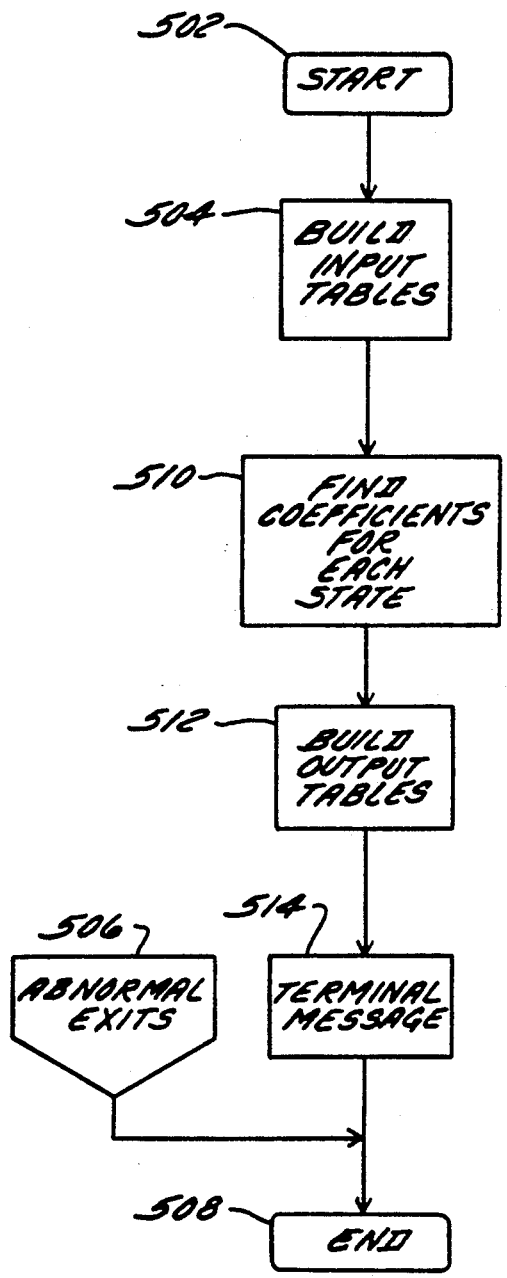
FIG. 5 is a flowchart illustrating the steps of the main routine implemented to calculate coefficients ($C_T$s)

Referring to FIG. 5, FIG. 5 illustrates the flowchart for the main routine of the program used for calculating $C_T$ based upon the data compiled during vehicle operation. The preferred embodiment of the program is written in RPL (Research Programming Language developed by Bolt, Bernak and Newman), and implemented on a main frame computer 66 such as a VAX 8530. The listing for the program listing is found in FIGS. 10A-10F.

Before the program can be used to compute the $C_T$S based upon the compiled data, the compiled data must first be transferred from the portable computer 56 to the VAX 66. This is accomplished using an RS-232 serial communications link and a communications protocol such as KERMIT. Subsequent to reception of the data, the computer 66 is used to format the data into a data table and give the table a name. An example of a data table is schematically illustrated in Table 1 below.

TABLE 1

| Vehicle Model XX | | | |
|---|---|---|---|
| (1) TIME (sec) | (2) STATE | (3) $T_{uh}$ (C0) | (4) $T_{act}$ (C0) |
| 10 | II | $T_{uh}1$ | $T_{act}1$ |

TABLE 1-continued

| Vehicle Model XX | | | |
|---|---|---|---|
| (1) TIME (sec) | (2) STATE | (3) $T_{uh}$ (C0) | (4) $T_{act}$ (C0) |
| 20 | II | $T_{uh}2$ | $T_{act}2$ |
| 30 | II | $T_{uh}3$ | $T_{act}3$ |
| 40 | I | $T_{uh}4$ | $T_{act}4$ |
| 50 | I | $T_{uh}5$ | $T_{act}5$ |
| 60 | I | $T_{uh}6$ | $T_{act}6$ |
| 70 | I | $T_{uh}7$ | $T_{act}7$ |
| 80 | I | $T_{uh}8$ | $T_{act}8$ |
| 90 | III | $T_{uh}9$ | $T_{act}9$ |
| 100 | III | $T_{uh}10$ | $T_{act}10$ |
| 110 | III | $T_{uh}11$ | $T_{act}11$ |
| 120 | III | $T_{uh}12$ | $T_{act}12$ |
| 130 | III | $T_{uh}13$ | $T_{act}13$ |
| 140 | IV | $T_{uh}14$ | $T_{act}14$ |
| 150 | IV | $T_{uh}15$ | $T_{act}15$ |
| 160 | IV | $T_{uh}16$ | $T_{act}16$ |
| 170 | IV | $T_{uh}17$ | $T_{act}17$ |
| 180 | IV | $T_{uh}18$ | $T_{act}18$ |
| 190 | IV | $T_{uh}19$ | $T_{act}19$ |
| 200 | IV | $T_{uh}20$ | $T_{act}$ |

While this example of a data table only illustrates 20 entries, a typical data table may include hundreds or thousands of entries for each of the states I-IV. Furthermore, the present method for estimating vehicle battery temperature requires that a data compilation be prepared for every model vehicle using the method.

Step 504 (initialize variables) is the first step which occurs after starting the main routine of the program (step 502). The flowchart illustrating the main steps of step 504 is illustrated in FIG. 6.

Figure 6:
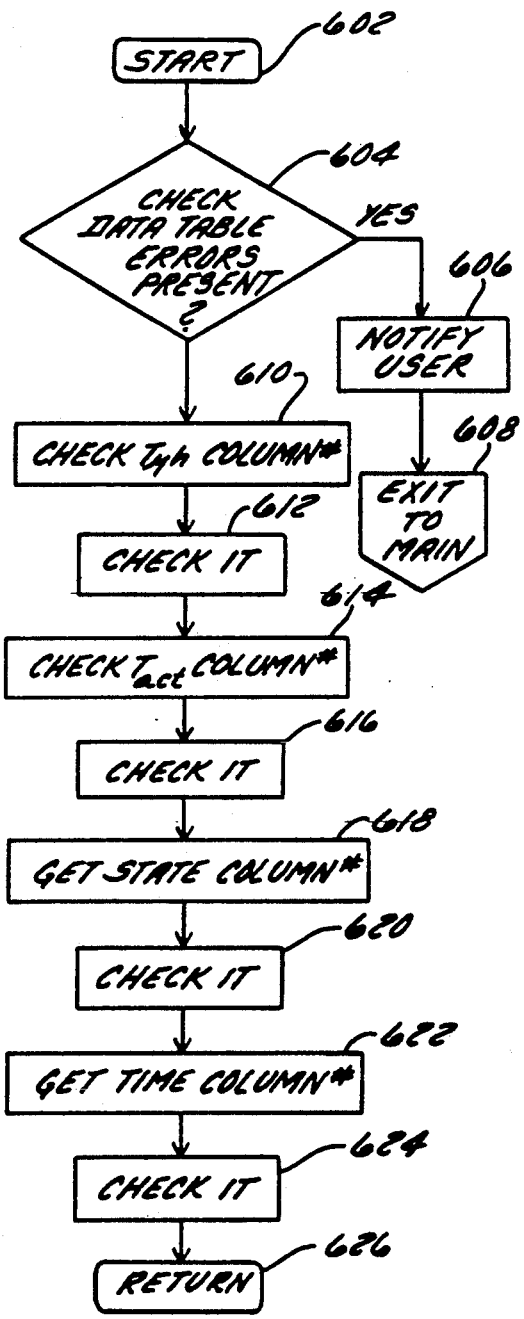
FIG. 6 is a flowchart illustrating the steps of the Build Input Table routine.

Referring to FIG. 6, Step 604 is the first step which occurs after this routine of the program is started (step 602). In step 604 the program checks the data table to insure that all of the data in the table is numeric. If the data is not all numeric, the program user is provided with an error message (step 608), an exit is made to the main routine (step 610), and the main routine abnormally exits and ends (steps 506, 508).

If the data table is in proper form, the next two steps executed are steps 610 and 612. In step 610, the program user is permitted to input the column number of the data table in which $T_{uh}$ is located. The purpose of this is to allow a program user to use the program with data tables wherein $T_{uh}$ is not stored in a default column. (For example, in Table 1 above, the column number for $T_{uh}$ is 3.)

Figure 7:
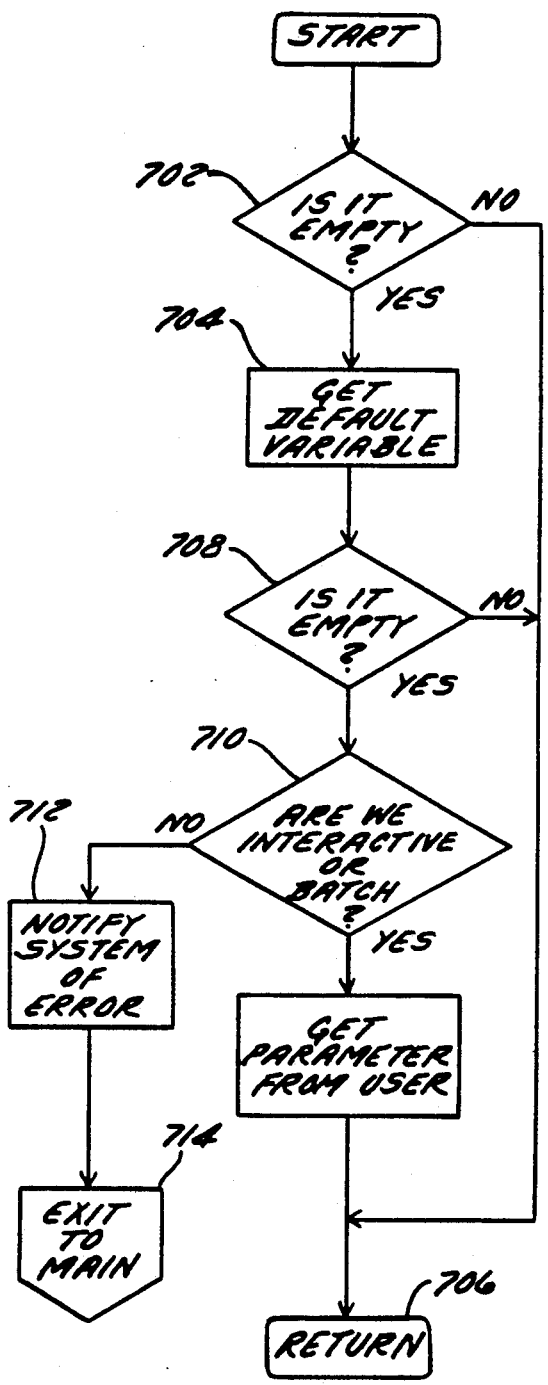
FIG. 7 is a flowchart illustrating the steps of the Check It routine.

Step 612 is the Check It routine which is further illustrated in FIG. 7. In step 702, the routine determines whether or not a program user input the column number for $T_{uh}$. If a column number was input then the routine returns (step 706) to step 614 of the initialize variables routine If a column number was not input then a default column number for $T_{uh}$ is provided by the program (step 704) and the routine returns (step 706) to step 614. (For example, for the program to properly handle the data from Table 1 above, the default column number for $T_{uh}$ would be 3.) If a default column number is not available (step 708), then the routine checks to see if it is in a user interactive mode (step 710). If the routine is in a user interactive mode, the column number for $T_{uh}$ is requested by the user (step 711). If the routine is not in a user interactive mode, the routine flags an error (step 712), an exit is made to the main routine (step 714), and the main routine abnormally exits and ends (steps 506, 508).

The next two steps executed are steps 614 and 616. In step 614, the program user is permitted to input the column number of the data table in which $T_{act}$ is located. The purpose of this is to allow a program user to use the program with data tables wherein $T_{act}$ is not stored in a default column. (For example, in Table 1 above, the column number for $T_{act}$ is 4.)

Step 616 is the same Check It routine discussed above in reference to FIG. 7. In step 702, the routine determines whether or not a program user input the column number for $T_{act}$. If a column number was input then the routine returns (step 706) to step 618 of the initialize variables routine. If a column number was not input then a default column number for $T_{act}$ is provided by the program (step 704) and the routine returns (step 706) to step 618. (For example, for the program to properly handle the data from Table 1 above, the default column number for $T_{act}$ would be 4.) If a default column number is not available (step 708), then the routine checks to see if it is in a user interactive mode (step 710). If the routine is in a user interactive mode, the column number for $T_{act}$ is requested by the user (step 712). If the routine is not in a user interactive mode, the routine flags an error (step 719), an exit is made to the main routine (step 714), and the main routine abnormally exits and ends (steps 506, 508).

The next two steps executed are steps 618 and 620. In step 618, the program user is permitted to input the column number of the data table in which the STATE is located. The purpose of this is to allow a program user to use the program with data tables wherein the STATE is not stored in a default column. (For example, in Table 1 above the column number for the STATE is 2.)

Step 620 is the same Check It routine discussed above in reference to FIG. 7. In step 702, the routine determines whether or not a program user input the column number for the STATE. If a column number was input then the routine returns (step 706) to step 622 of the initialize variables routine. If a column number was not input then a default column number for the STATE is provided by the program (step 704) and the routine returns (step 706) to step 622. (For example, for the program to properly handle the data from Table 1 above, the default column number for the STATE would be 2.) If a default column number is not available (step 708), then the routine checks to see if it is in a user interactive mode (step 710). If the routine is in a user interactive mode, the column number for the STATE is requested by the user (step 712). If the routine is not in a user interactive mode, the routine flags an error (step 712), an exit is made to the main routine (step 714), and the main routine abnormally exits and ends (steps 506, 508).

The final two steps executed before returning to the main routine are steps 622 and 624. In step 622, the program user is permitted to input the column number of the data table in which the time is located. The purpose of this is to allow a program user to use the program with data tables wherein the time is not stored in a default column. (For example, in Table 1 above the column number for the time is 1.)

Step 620 is the same Check It routine discussed above in reference to FIG. 7. In step 702, the routine determines whether or not a program user input the column number for the time. If a column number was input then the routine returns (step 706) to step 626 of the initialize variables routine. If a column number was not input then a default column number for the time is provided by the program (step 704) and the routine returns (step 706) to step 626. (For example, for the program to properly handle the data from Table 1 above, the default column number for the time would be 1.) If a default column number is not available (step 708), then the routine checks to see if it is in a user interactive mode (step 710). If the routine is in a user interactive mode, the column number for the time is requested by the user (step 712). If the routine is not in a user interactive mode, the routine flags an error (step 712), an exit is made to the main routine (step 714), and the main routine abnormally exits and ends (steps 506, 508).

At step 626, the initialize variables routine returns to the main routine.

At step 510 of the main routine the coefficients $C_T$ for each state are calculated. The steps of step 510 are further illustrated in the Find Coefficients (FIG. 8) and the Find State Coefficient (FIG. 9) routines.

Figure 8:
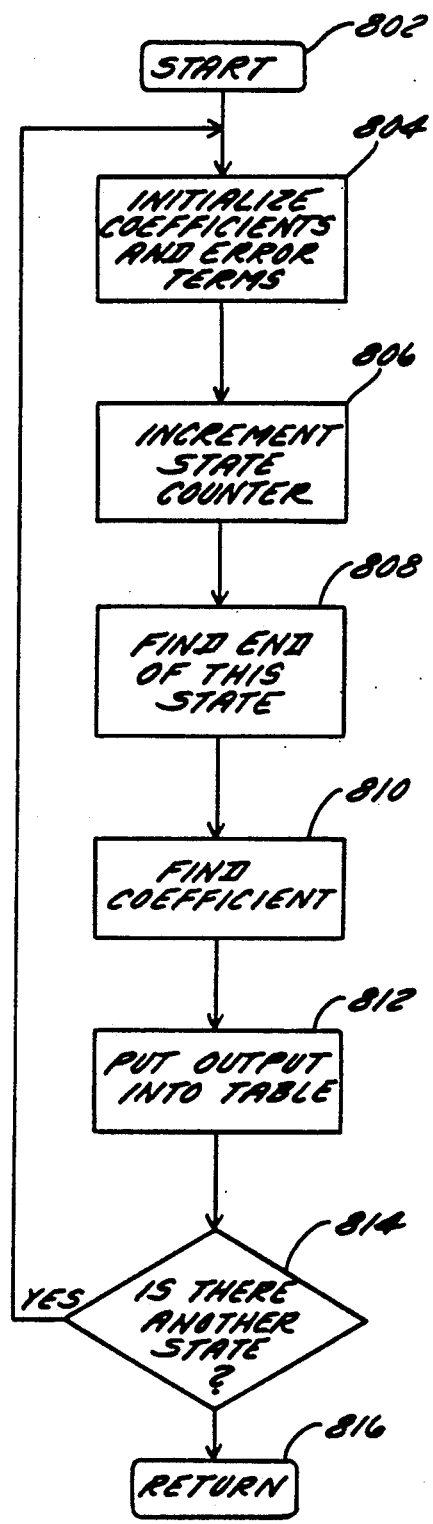
FIG. 8 is a flowchart illustrating the steps of the Find Coefficients routine.
Figure 9:
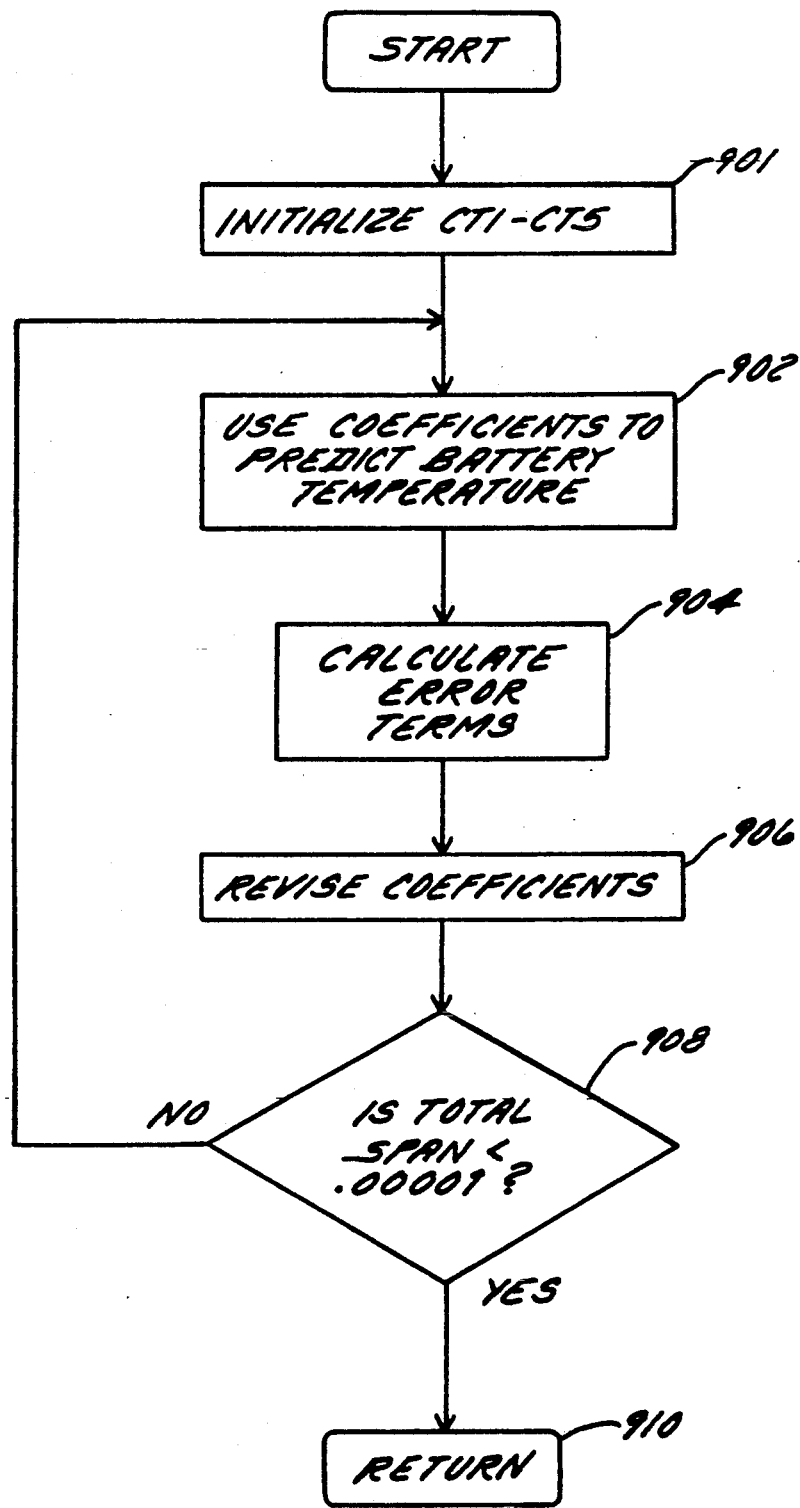
FIG. 9 is a flowchart illustrating the steps of the Find State Coefficient routine.

Referring to FIG. 8, the first step after starting the routine (step 802) is step 804. At step 804, all of the memory locations for the coefficients ($C_TS$) and the error terms (discussed below) are set to 0. At step 806 the STATE counter is incremented by 1. (For example, if the current state is I, the state counter is set to 2 which corresponds to STATE II.) At step 808, the last row of data for the current state in the data table is found. (For example, referring to Table 1, the last row for the data of STATE II is at row 3.)

In the preferred embodiment of the Find Coefficients routine, the routine expects that all of the rows of data for a given state in a given data table are listed in the data table consecutively. Accordingly, if data is compiled in such a way that all of the data for a given state is not found in consecutive rows of a data table, then the data table must be reformatted such that the data for a given state is found in consecutive rows.

One method for reformatting a data table with non-consecutive rows of data for a certain state includes the steps of:

setting up a temporary file;

reading each row of data for STATE I from the data table and writing the data into the temporary file;

reading each row of data for STATE II from the data table and writing the data into the temporary file;

reading each row of data for STATE III from the data table and writing the data into the temporary file;

reading each row of data for STATE IV from the data table and writing the data into the temporary file; and writing the temporary file over the data table file. (The data table illustrated in Table 1 is shown with the data for each state in consecutive rows.)

At step 810, the coefficient $C_T$ is determined for the current state. The steps of step 810 are further illustrated in the Find State Coefficient routine illustrated in FIG. 9.

The Find State Coefficient routine determines $C_T$ for a state using an interative process. At step 901, as a first step of the iteration, five different $C_TS$ are initialized as follows:

$$C_{T1}=0 \; C_{T2}=0.25 \; C_{T3}=0.5 \; C_{T4}=0.75 \; C_{T5}=1$$

At step 902, predicted battery temperatures ($T_{bpred}$) are calculated for each of five selected $C_TS$ ($C_{T1}$-$C_{T5}$) as applied to each row of data in the data table for the current state. The equation used to calculate $T_{bpred}$ is:

$$T_{bpred} = \frac{[T_{bpred-1} + (T_{uh} + T_{uh-1} - T_{bpred-1}) \times C_T \times \Delta t/2]}{[1 + C_T \times \Delta t/2]}$$

wherein when calculating $T_{bpred}$ for the first row of data for a given state, $T_{bpred-1}$ and $T_{uh-1}$ would equal $T_{uh}$. For subsequent rows of, $T_{bpred-1}$ would the $T_{bpred}$ as calculated for the prior row of data, and $T_{uh-1}$ would the $T_{uh}$ from the prior row of data. For example, referring to Table 1, if the current state were STATE IV, and $T_{bpred}$ were being calculated for the first row of data for STATE IV, $T_{bpred-1}$, $T_{uh}$ and $T_{uh-1}$ would be $T_{uh}$. When $T_{bpred}$ is calculated for the second row of data for STATE IV, $T_{bpred-1}$ would be $T_{bpred}$ as calculated for the prior row of data, and $T_{uh-1}$ would be $T_{uh}$ from the prior row of data.

At step 904, an error term (ET1-ET5) is calculated for each $C_T$. This error term is calculated by squaring the difference $(T_{bpred}-T_{act})$, and summing the squares of the differences for each $C_T$ as applied to each row of data in the data table for the current state.

For example, referring to Table 1, if the current state were STATE IV, $T_{bpred}$ would be calculated for each of time entries 140–400 using $T_{uh}$ and $C_T1$, the square of $(T_{bpred}-T_{act})$ would be calculated for each of the time entries 140–200 seconds, and the squares for each of the time entries 140–200 would be summed to provide an error term (ET1). This error term (ET1) would then be entered into a data field corresponding to the coefficient $C_T1$ as schematically represented in Table 2 below. The error terms ET2-ET5 are calculated in the same manner as discussed above for ET1. Table 2 below represents the coefficients $C_T1$-$C_T5$ used for the first iteration and their corresponding error terms ET1-ET5.

TABLE 2

| First Iteration | | | | |
|---|---|---|---|---|
| $C_T1 = 0$ | $C_T2 = .25$ | $C_T3 = .5$ | $C_T4 = .75$ | $C_T5 = 1$ |
| ET1 | ET2 | ET3 | ET4 | ET5 |

At step 906, five new coefficients are selected for use in a second iteration. These coefficients are selected according to the following first set of procedure steps 1-5 when $C_T1$ or $C_T5$ do not have the smallest error terms:

1) the coefficient $C_T(x)$ with the lowest error term ET(x) is selected as new $C_T3$;
2) the coefficient $C_T(x-1)$ is selected as new $C_T1$;
3) the coefficient $C_T(x+1)$ is selected as new $C_T5$;
4) new $C_T2$ is the average of $C_T(x)$ and $C_T(x-1)$; and
5) new $C_T3$ is the average of $C_T(x)$ and $C_T(x+1)$.

In the event that $C_T1$ is the coefficient with the smallest error term ET1, the following second set of procedure steps 1-5 are followed to select new coefficients $C_T1$-$C_T5$:

1) $C_T1$ is selected as new $C_T1$;
2) $C_T2$ is selected as new $C_T3$;
3) $C_T3$ is selected as new $C_T5$;
4) new $C_T2$ is the average of $C_T(1)$ and $C_T(2)$; and
5) new $C_T4$ is the average of $C_T(2)$ and $C_T(3)$.

In the event that $C_T5$ is the coefficient with the smallest error term ET5, the following third set of procedure steps 1-5 are followed to select new coefficients $C_T1$-$C_T5$:

1) $C_T5$ is selected as new $C_T5$;
2) $C_T4$ is selected as new $C_T3$;
3) $C_T3$ is selected as new $C_T1$;
4) new $C_T4$ is the average of $C_T(5)$ and $C_T(4)$; and
5) new $C_T2$ is the average of $C_T(4)$ and $C_T(3)$.

To illustrate the implementation of the first, second and third set of procedure steps, a new set of coefficients $C_T1$-$C_T5$ will be prepared for a first example, wherein $C_T1$ has the smallest error term ET1, a second example, wherein $C_T2$ has the smallest error term ET2, and a third example wherein $C_T5$ has the smallest error term ET5. Tables 3 illustrates the new coefficients which would be used for a second iteration under the conditions of the first, second, and third examples.

TABLE 3

| Second Iteration (first example) | | | | |
|---|---|---|---|---|
| $C_T1 = 0$ | $C_T2 = .125$ | $C_T3 = .25$ | $C_T4 = .375$ | $C_T5 = .5$ |
| Second Iteration (second example) | | | | |
| $C_T1 = 0$ | $C_T2 = .125$ | $C_T3 = .25$ | $C_T4 = .375$ | $C_T5 = .5$ |
| Second Iteration (third example) | | | | |
| $C_T1 = .5$ | $C_T2 = .625$ | $C_T3 = .75$ | $C_T4 = .875$ | $C_T5 = 1$ |

At step 908, $C_T1$ is subtracted from $C_T5$ and the absolute value of the difference is compared against 0.000001. If the absolute values is greater than 0.000001 then steps 902, 904 and 906 are again performed. If the absolute value is less than 0.000001 then a return is made to the Find Coefficients routine (step 910) to step 812.

Returning to FIG. 8, at step 812, the $C_T$ value calculated for the current state is stored in an output table or file. At step 814, the state counter is checked. If the state counter is 4 or less, a return is made to the start of the routine. If the state counter is 5 the $C_T3$ for each of the 4 states has been calculated and a return is made to the main routine (step 816).

Returning to FIG. 5, when a return is made from the Find Coefficients routine (FIG. 8), an output table is built which includes the values of $C_T3$ obtained for each state (STATES I-IV). Thus, each of the four states would be associated with its respective $C_T3$ value. At step 514 a completion message is performed to the program user, and the program is ended (step 508).

After calculation of the coefficients ($C_T$s), the coefficients $C_T$s are loaded into the control unit 10 memory 16 from a computer 44 coupled to the control unit 10. As discussed above, the $C_T$ values are used during the battery estimation process. The $C_T$s are normally stored in memory as a lookup table such that they are associated with one of the four states dependent upon vehicle speed, but a further step could be taken wherein a function is derived such that $C_T$ is a continuous function of vehicle speed or vehicle state. Thus, the lookup function for $C_T$S can be performed by either referencing a lookup table with the vehicle state, or calculating $C_T$s as a function While one preferred exemplary embodiment of the invention and variations of the embodiment have been illustrated and discussed in detail herein, it is contemplated that one skilled in the art can make modifications to the embodiment designed to adapt the invention for use with various applications not disclosed herein. It is further contemplated that these modifications may be made without departing from the scope of the invention as claimed below.

We claim:

1. A method for charging a vehicle battery located in the engine compartment of a vehicle, the method comprising the steps of:

providing a vehicle with means for selectively controlling a charge voltage at which the vehicle battery is charged;

charging a vehicle battery at a charge voltage;

reading a first reference temperature from a temperature sensor within the engine compartment at a first time;

reading a second reference temperature from the temperature sensor with in the engine compartment at a second time;

determining a vehicle parameter at the second time;

determining a time difference between the first time and the second time;

performing a look up function to determine a coefficient, wherein the input to the look up function is the vehicle parameter;

estimating the vehicle battery temperature as a function of the first reference temperature, the second reference temperature, the time difference, and the coefficient;

reading a battery charging voltage at the second time;

determining an acceptable range of battery charging voltages for the estimated temperature;

applying a control signal related to the acceptable range to the means for selectively controlling which adjusts the charge voltage within the acceptable range of battery charging voltages;

wherein the step of estimating the vehicle battery temperature further comprises the steps of:

providing an initial battery temperature;

determining a first product of the coefficient and one-half of the time difference;

determining a first sum of 1 and the first product;

determining a second sum of the first reference temperature and the second reference temperature;

determining a first difference between the second sum and the initial battery temperature;

determining a second product of the first difference and the first product;

determining a third sum of the second product and the initial battery temperature; and determining a quotient of the third sum and the first sum, wherein the quotient is the estimated vehicle battery temperature.

2. The method of claim 1, wherein the vehicle parameter is vehicle speed, and the step of performing the look up function comprises the steps of:

comparing the vehicle speed to a plurality of predetermined ranges of vehicle speeds, wherein each range of vehicle speeds corresponds to a vehicle state; and accessing a look up table to determine the coefficient, wherein the look up table is accessed based upon the vehicle state.

3. The method of claim 1, wherein the range of battery charging voltages includes only one charging voltage.

4. The method of claim 1, wherein the vehicle parameter is vehicle speed, and the step of performing the look up function comprises the steps of:

comparing the vehicle speed to a plurality of predetermined ranges of vehicle speeds, wherein each range of vehicle speeds corresponds to a vehicle state; and determining the coefficient from a function of vehicle state.

5. The method of claim 1, wherein the step of applying a control signal includes the step of comparing the charge voltage to the acceptable range of battery charging voltages.

6. A method for adjusting a charge voltage of a vehicle battery based upon the estimated temperature of the battery which is located in the engine compartment of a vehicle and adjusting the charge voltage of the vehicle battery based upon the estimated temperature of the battery, the method comprising the steps of:

1) determining a plurality of operational coefficients each associated with a vehicle parameter, the determination of each operational coefficient comprising the step of:

(1a) determining and storing at least one vehicle parameter during a first time period;

(1b) reading and storing at least one under hood temperature value from a temperature sensor during the first time period;

(1c) reading and storing at least one vehicle battery temperature value from a battery temperature sensor during the first time period;

(1d) providing an array of estimated temporary coefficients;

(1e) determining an array of estimated battery temperatures as a function of the under hood temperature and the array of temporary coefficients;

(1f) comparing each of the array of estimated battery temperatures with the respective vehicle battery temperature to determine an array of error terms each associated with one of the array of temporary coefficients;

(1g) selecting the one of the array of temporary coefficients having the smallest error term and saving the temporary coefficient as an operational coefficient referenced to the vehicle parameter;

2) estimating the temperature of the vehicle battery comprising the steps of:

(2a) determining an operating vehicle parameter during a second time period;

(2b) reading an under hood temperature value from a temperature sensor during the second time period;

(2c) selecting the one of the plurality of operational coefficients referenced to a vehicle parameter substantially similar to the operating vehicle parameter determined during the second time period; and (2d) producing an estimated battery temperature as a function of the under hood temperature and the selected operating coefficient; and 3) adjusting the charge voltage at the vehicle battery based upon the estimated battery temperature.

7. The method of claim 6, wherein:

1) the step of determining and storing at least one vehicle parameter during the first time period comprises the steps of:

determining engine speed;

comparing the engine speed to a plurality of engine speed ranges each associated with a vehicle state;

determining the vehicle state associated with the engine speed range within which the engine speed falls; and storing the vehicle state as the vehicle parameter; and 2) the step of determining an operating vehicle parameter during a second time period, comprises the steps of:

determining engine speed;

comparing the engine speed to the plurality of engine speed ranges;

determining the vehicle state associated with the engine speed range within which the engine speed falls; and storing the vehicle state as the operating vehicle parameter.

8. The method of claim 6, wherein:

1) the step of determining and sorting at least one vehicle parameter during the first time period comprises the steps of:

determining vehicle speed;

comparing the vehicle speed to a plurality of vehicle speed ranges each associated with a vehicle state;

determining the vehicle state associated with the vehicle speed range within which the vehicle speed falls; and storing the vehicle state as the vehicle parameter; and 2) the step of determining an operating vehicle parameter during a second time period comprises the steps of:

determining vehicle speed;

comparing the vehicle speed to the plurality of vehicle speed ranges;

determining the vehicle state associated with the vehicle speed range within which the vehicle speed falls; and storing the vehicle state as the operating vehicle parameter.

9. The method of claim 6, wherein the step of providing an array of estimated temporary coefficients comprises the step of estimating one temporary coefficient.

10. The method of claim 6, wherein the step of providing an array of estimated temporary coefficients comprises the step of estimating a plurality of temporary coefficient.

11. The method of claim 6, wherein the step of determining the array of error terms comprises the step of squaring the difference between each one of the array of estimated battery temperatures and the respective vehicle battery temperature.

* * * * *

UNITED STATES PATENT AND TRADEMARK OFFICE
CERTIFICATE OF CORRECTION

PATENT NO. : 5,079,716

DATED : January 7, 1992

INVENTOR(S) : Brett M. Lenhardt, Arlen P. Walker and William C. Delaney

It is certified that error appears in the above-identified patent and that said Letters Patent is hereby corrected as shown below:

Col. 15  Line 9, "with in" should read --within--.

Col. 17  Line 11, "sorting" should read --storing--.

Signed and Sealed this

Twenty-seventh Day of April, 1993

Attest:

MICHAEL K. KIRK

Attesting Officer

Acting Commissioner of Patents and Trademarks